United States Patent
Mesa (10) Patent No.: US 10,006,385 B1
(45) Date of Patent: Jun. 26, 2018

(54) POSITIVE CRANKCASE VENTILATION GAS DIVERSION SYSTEM

(71) Applicant: Gilberto Mesa, Miami, FL (US)

(72) Inventor: Gilberto Mesa, Miami, FL (US)

( * ) Notice: Subject to any disclaimer, the term of this patent is extended or adjusted under 35 U.S.C. 154(b) by 0 days. days.

(21) Appl. No.: 15/177,866

(22) Filed: Jun. 9, 2016

Related U.S. Application Data (60) Provisional application No. 62/203,098, filed on Aug. 10, 2015.

(51) Int. Cl.
| | |
|---|---|
| *F02M 25/08* | (2006.01) |
| *F02D 41/00* | (2006.01) |
| *F02D 41/22* | (2006.01) |

(52) U.S. Cl.
 CPC ......... *F02D 41/003* (2013.01); *F02M 25/089* (2013.01)

(58) Field of Classification Search
 CPC ... F01M 13/028; F02D 41/0045; F02D 41/38; F02D 2041/289; F02M 37/04; F02M 37/0023; F02M 37/0076; F02M 25/06; F02M 25/0872; F02M 25/0836
 See application file for complete search history.

(56) References Cited

U.S. PATENT DOCUMENTS

| | | | | |
|---|---|---|---|---|
| 2,731,958 | A * | 1/1956 | Robley | ............ F01M 13/04 123/573 |
| 4,627,406 | A * | 12/1986 | Namiki | ............ F01M 13/04 123/572 |
| 5,992,397 | A | 11/1999 | Hideaki et al. | |
| 6,058,917 | A * | 5/2000 | Knowles | ............ F01M 13/04 123/573 |
| 6,293,260 | B1 * | 9/2001 | Atanasyan | ............ F02D 41/003 123/295 |
| 6,502,562 | B1 | 1/2003 | Manalo | |
| 6,866,031 | B2 | 3/2005 | Spiegel et al. | |
| 7,004,152 | B2 | 2/2006 | Manalo | |
| 7,117,859 | B1 | 10/2006 | Martin | |
| 7,383,806 | B2 | 6/2008 | Abi-Akar et al. | |
| 7,543,573 | B2 * | 6/2009 | Olree | ............ F01M 13/022 123/41.86 |
| 7,866,304 | B2 | 1/2011 | Riedel et al. | |
| 7,918,214 | B2 * | 4/2011 | Kerns | ............ F02D 41/0042 123/520 |

(Continued)

*Primary Examiner* — Hieu T Vo
*Assistant Examiner* — Arnold Castro
(74) *Attorney, Agent, or Firm* — Malloy and Malloy, PL (57) ABSTRACT

A positive crankcase ventilation gas diversion system comprises a positive crankcase ventilation gas diversion line to divert oil laden positive crankcase ventilation gases from the air intake manifold of an internal combustion engine. A positive crankcase ventilation gas diversion interconnect directs oil laden positive crankcase ventilation gases into an oil-vapor diffuser which at least partially separates crankcase oils from the oil laden positive crankcase ventilation gases. A pressure sensor measures a vapor pressure in a headspace of a fuel tank, and a fuel tank vent valve is operative with a fuel tank vent line. A controller actuates the fuel tank vent valve into an open position and discharges fuel enriched vapor to the air intake manifold of the internal combustion engine, thereby maintaining the vapor pressure in the headspace of the fuel tank within a predetermined pressure range.

17 Claims, 6 Drawing Sheets

(56) References Cited

U.S. PATENT DOCUMENTS

| | | | |
|---|---|---|---|
| 7,992,548 B2 | 8/2011 | Bucknell et al. | |
| 8,490,607 B2 | 7/2013 | Ghafari et al. | |
| 8,893,690 B2 | 11/2014 | Efta et al. | |
| 9,260,993 B1* | 2/2016 | Mainiero | B01D 45/08 |
| 2002/0088212 A1* | 7/2002 | Ernst | B01D 45/02 |
| | | | 55/385.3 |
| 2003/0024512 A1* | 2/2003 | Kitano | F01M 13/0011 |
| | | | 123/572 |
| 2004/0069286 A1* | 4/2004 | Knowles | F01M 13/022 |
| | | | 123/572 |
| 2007/0240391 A1* | 10/2007 | Becker | B01D 46/0031 |
| | | | 55/423 |
| 2008/0236551 A1* | 10/2008 | Althof | F02D 41/003 |
| | | | 123/520 |
| 2010/0012097 A1* | 1/2010 | Jauss | B01D 45/02 |
| | | | 123/518 |
| 2010/0275886 A1* | 11/2010 | Riedel | F01M 13/04 |
| | | | 123/518 |
| 2011/0197864 A1* | 8/2011 | Karcher | F02M 25/06 |
| | | | 123/574 |
| 2013/0013171 A1 | 1/2013 | Ghafari et al. | |
| 2014/0081564 A1* | 3/2014 | Pursifull | F02M 35/10222 |
| | | | 701/113 |
| 2014/0318514 A1* | 10/2014 | Pursifull | F01M 13/022 |
| | | | 123/568.29 |
| 2015/0083088 A1* | 3/2015 | Pearce | F02M 25/0809 |
| | | | 123/520 |
| 2015/0292429 A1* | 10/2015 | Surnilla | F02D 41/144 |
| | | | 701/108 |

* cited by examiner

POSITIVE CRANKCASE VENTILATION GAS DIVERSION SYSTEM

BACKGROUND OF THE INVENTION

Field of the Invention

A positive crankcase ventilation gas diversion system includes a positive crankcase ventilation gas diversion line to divert oil laden PCV gases from the air intake manifold of an internal combustion engine. The oil laden PCV gases are directed through an oil-vapor diffuser to at least partially separate crankcase oils from the PCV gases before the stripped gases are returned to the air intake manifold of the engine.

Description of the Related Art

Figure 3:
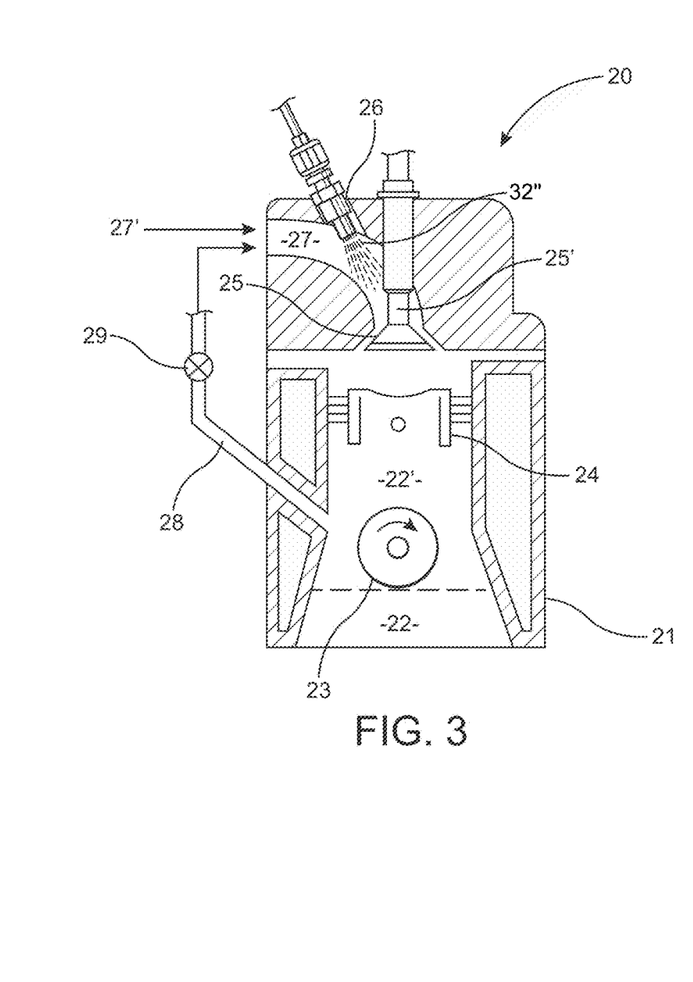
FIG. 3 is a cross-sectional view of a portion of an internal combustion engine having an indirect or port fuel injector.

Until recent years, internal combustion engines in automobiles typically employed an indirect or port fuel injection system, such as is shown by way of example in FIG. 3. As may be seen from FIG. 3, aerosolized fuel is injected into the air intake manifold, where it is mixed with the fresh air intake as well as with oil laden positive crankcase ventilation ("PCV") gases vented from the crankcase into the air intake manifold. More importantly, by injecting aerosolized fuel into the air intake manifold, the fuel served to continually "wash" the valve and valve stem, thereby minimizing the build of oil residue from the oil laden PCV gases.

Figure 4:
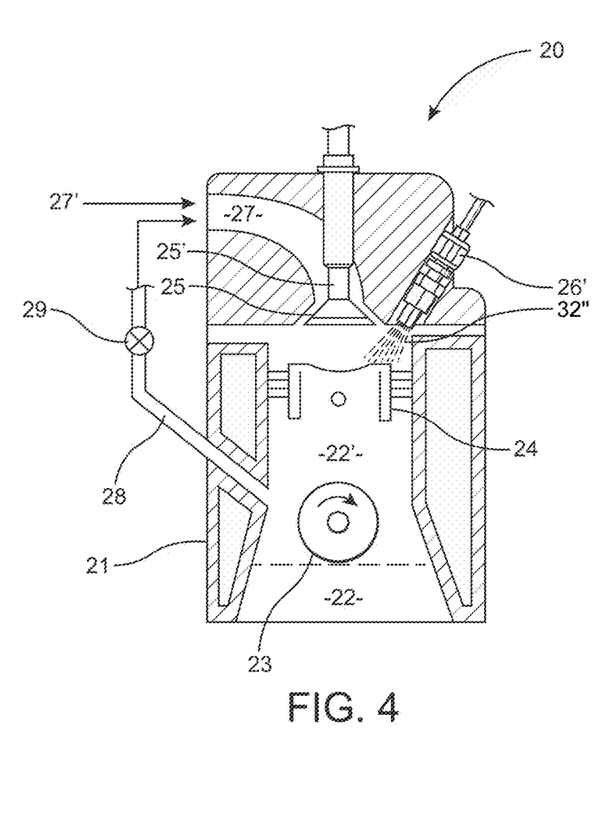
FIG. 4 is a cross-sectional view of a portion of an internal combustion engine having a direct fuel injector.

Faced with increased fuel efficiency requirements, particularly in the United States, many automobile manufacturers began utilizing direct fuel injection, such as is shown by way of example in FIG. 4. As is readily apparent from FIG. 4, the direct fuel injector(s) inject fuel downstream of the valve and valve stem, therefore, there is no continuous flow of fuel to "wash" these components. As a result, even after moderate operation of about 60,000 miles, substantial carbon buildup from baked on oil residue is visible, such as is shown in the photograph presented in FIG. 2. This buildup, at a minimum, results in significantly reduced operation efficiency, thereby defeating the purpose of the direct fuel injection system. More importantly, in many cases the carbon buildup leads to premature catastrophic engine failure, thus requiring replacement or rebuilding, at considerable expense to the owner.

Figure 2:
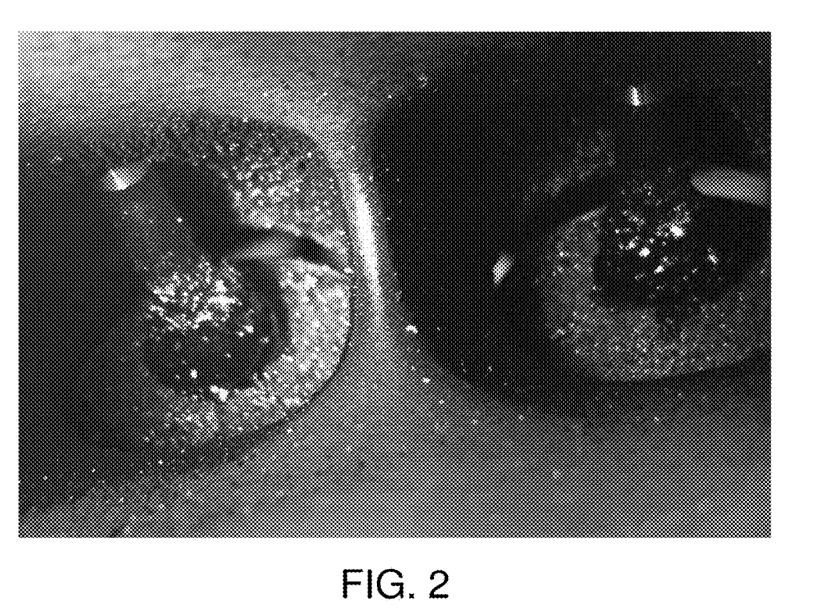
FIG. 2 is a photograph of a valve and valve stem in an internal combustion engine having a direct fuel injection system after being driven approximately 60,000 miles.

Various methods of cleaning carbon buildup from valves and valve stems, such as is shown in the photograph in FIG. 2, have been proposed, but none are believed to be more than nominally effective, and all are extremely time and labor intensive, and thus, expensive for the owner to undertake.

One attempt to resolve the problems created by direct fuel injection has been to provide both indirect and direct fuel injectors. As will be appreciated, this results in a decrease in efficiency, relative to an engine having direct fuel injection itself, with the further disadvantage of the considerable added expense of building an engine having multiple fuel injectors and the corresponding control systems for the same. Furthermore, this solution does not readily lend itself to the retrofit of an engine originally equipped solely with direct fuel injection.

A further problem with operation of an internal combustion engine, regardless of whether it employs indirect fuel injection, direct fuel injection, or a combination of the two, is that a certain amount of crankcase oils entrained in the positive crankcase ventilation gases enter the combustion chamber. Unfortunately, combustion of crankcase oils is much less than complete, leading to an increase in harmful emissions, as well as a corresponding decrease in fuel efficiency. This problem is exacerbated as carbon buildup from baked on oil residue begins to occur on the valves, valve stems, and related components. Specifically, carbon buildup obstructs airflow to the combustion chamber, again, leading to incomplete combustion, increased emissions, and reduced fuel efficiency. Carbon buildup occurs even in engines having indirect fuel injectors, albeit to a much lesser degree. This is due to the fact that the air intake stroke, and thus the time for oil laden positive ventilation crankcase gases to enter the combustion chamber is much longer than the fuel injector spray cycle time. Therefore, only a portion of the incoming raw crankcase oils entrained in the positive ventilation crankcase gases are "washed" out of the gases via indirect fuel injectors, while the remainder of the raw crankcase oil particles are directed into the combustion chamber where they are only partially combusted, as described above.

As such, it would be extremely beneficial to provide a system which significantly reduces if not eliminates carbon buildup from oil residue on the valve, valve stem, and other moving components of an internal combustion engine employing direct injection, without sacrificing the fuel efficiency thereof. It would be further advantageous to provide a system which may be easily installed as either original equipment or retrofitted to an existing internal combustion engine assembly employing direct injection having minimal parts and relative cost. It would also be useful to provide a system for an internal combustion engine employing direct injection which not only removes crankcase oils from oil laden PCV gases, but dissolves the crankcase oils into liquid fuels or other suitable solvents for combustion therewith. Another benefit may be realized by providing a method for reducing harmful positive crankcase ventilation gas emissions during operation of any internal combustion engine, regardless of the type of injection system employed, by minimizing if not eliminating the introduction of raw crankcase oils entrained in positive ventilation crankcase gases from entering the combustion chamber.

SUMMARY OF THE INVENTION

The present invention is directed to a positive crankcase ventilation gas diversion system for an internal combustion engine assembly employing direct fuel injection. More in particular, an internal combustion engine assembly includes an internal combustion engine having a crankcase containing an amount of engine oil, and a positive crankcase ventilation line routed into the air intake manifold. A fuel supply includes a fuel tank having an amount of fuel and a headspace thereover having an amount of fuel enriched vapor therein. A fuel pump and fuel supply line provide fuel to one or more direct fuel injectors. A fuel return line returns excess fuel to the fuel tank, while a fuel tank vent line directs fuel enriched vapor from the headspace of the fuel tank to the air intake manifold.

In accordance with one embodiment of the present invention, a positive crankcase ventilation gas diversion system comprises a positive crankcase ventilation gas diversion line which diverts oil laden positive crankcase ventilation ("PCV") gases from the air intake manifold of the internal combustion engine. In one further embodiment, a positive crankcase ventilation gas diversion interconnect directs oil laden PCV gases from the positive crankcase ventilation gas diversion line into the fuel return line of the fuel supply.

In at least one embodiment, the oil laden PCV gases are directed though an oil-vapor diffuser which at least partially separates crankcase oils from the oil laden PCV gases. The oil-vapor diffuser comprises a diffusion chamber having screen, mesh, or other such structure to provide the contact area necessary for separation of crankcase oils from the oil laden PCV gases. In at least one further embodiment, a diffusion chamber contains an amount of gasoline, diesel fuel or another suitable solvent into which the crankcase oils removed from the oil laden PCV gases are dissolved for subsequent combustion in the internal combustion engine.

A pressure sensor is provided in at least one embodiment to measure a vapor pressure in the headspace of the fuel tank, and in one further embodiment, the pressure sensor is operative with a controller to maintain a vapor pressure in the headspace of the fuel tank within a predetermined pressure range. More in particular, a fuel tank vent valve is operative with the fuel tank vent line, and in one further embodiment, a controller actuates the fuel tank vent valve into an open position upon detection of a vapor pressure outside of a predetermined pressure range, thereby supplying fuel enriched vapor to the air intake manifold of the internal combustion engine. As such, the vapor pressure in the headspace of the fuel tank is maintained within the predetermined pressure range.

The present invention is further directed to a method for reducing positive crankcase ventilation gas emissions during operation of an internal combustion engine assembly. In accordance with at least one embodiment, the present method comprises: diverting an amount of oil laden positive crankcase ventilation gases from the air intake manifold of an internal combustion engine; diffusing the oil laden positive crankcase ventilation gases through an oil-vapor diffuser; diluting the diffused positive crankcase ventilation gases into an amount of liquid fuel; and, supplying an amount of fuel enriched vapor from a headspace of a fuel tank to the air intake manifold of the internal combustion engine.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
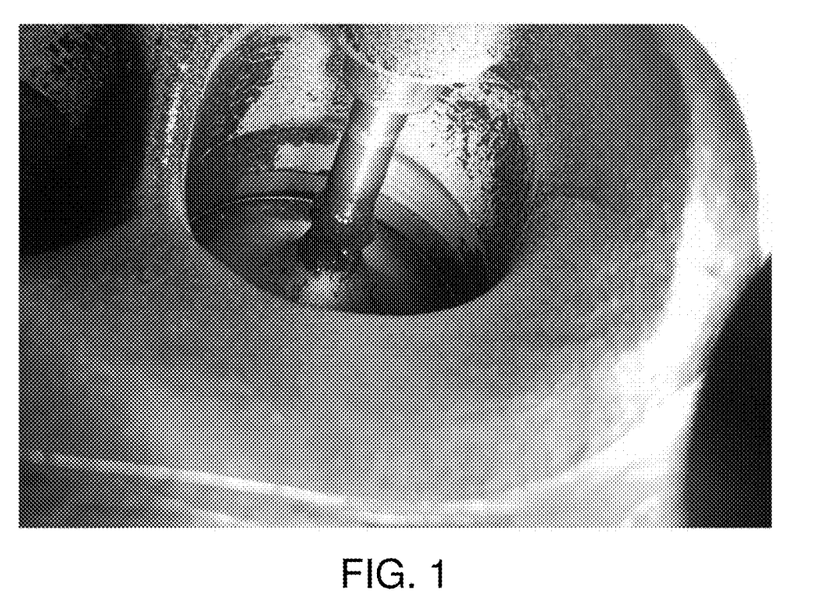
FIG. 1 is a photograph of a valve and valve stem in an internal combustion engine having a direct fuel injection system after being driven approximately 15,000 miles.

FIG. 1 is a photograph of a valve and valve stem in an internal combustion engine employing a direct fuel injection system after being driven approximately 15,000 miles. As is apparent, especially when compared to the photograph of the valve and valve stem in FIG. 2, relatively little carbon buildup is visible on either the valve or valve stem after 15,000 miles of operation.

Conversely, the valve and valve stem in the photograph in FIG. 2, also of an internal combustion engine employing a direct fuel injection system but after being driven approximately 60,000 miles, show substantial visible amounts of carbon buildup on both the valve and valve stem. This visible carbon buildup is a result of engine oil which is entrained in oil laden positive crankcase ventilation ("PCV") gases 22', which are vented into an air intake manifold 27 of an internal combustion engine 20 having a direct fuel injector 26', as shown best in FIG. 4.

FIG. 3 is a cross-sectional view of a portion of an internal combustion engine 20 having an indirect or port fuel injector 26, which were common in internal combustion engines until recent years. FIG. 4 is a cross-sectional view of a portion of an internal combustion engine 20 having a direct fuel injector 26', which are now commonplace in internal combustion engines 20.

As shown in both FIGS. 3 and 4, an internal combustion engine 20 includes a crankcase 21 containing an amount of engine oil 22, which lubricates the crankshaft 23, among other internal moving parts. One or more cylinders 24 are mounted in communication with the crankcase 21, and a corresponding valve 25 is operative with each cylinder 24. Each valve 25 has a corresponding valve stem 25' which is operative with the valve 25 into the cylinder 24 to compress an amount of fuel and air for combustion.

An amount of oil laden PCV gases 22' are present in the headspace above the oil 22 in the crankcase 21 while the internal combustion engine 20 is in operation, as shown in FIGS. 3 and 4. The oil laden PCV gases 22' are periodically vented from the crankcase 21 during operation of the internal combustion engine 20 through positive ventilation crankcase line 28. More in particular, the oil laden PCV gases 22' are vented into the air intake manifold 27 of the internal combustion engine 20, as shown in FIGS. 3 and 4. A PCV valve 29 is installed in the positive crankcase ventilation line 28, and the PCV valve 29 controls the venting of oil laden PCV gases 22' from the crankcase 21 into the air intake manifold 27, based on a predetermined pressure in the positive crankcase ventilation line 28.

With reference to the internal combustion engine 20 comprising an indirect fuel injector 26 of FIG. 3, an amount of fuel 32", which has been aerosolized for combustion, is injected into a portion of the air intake manifold 27 along with fresh air intake 27'. In addition, oil laden PCV gases 22' are periodically vented into the air intake manifold 27, as described above. As also shown in FIG. 3, the indirect fuel injector 26 injects aerosolized fuel 32" into a portion of the air intake manifold 27 upstream of the valve 25 and corresponding valve stem 25'. As such, during operation, aerosolized fuel 32" serves to continually "wash" the valve 25 and valve stem 25', and oil introduced with the oil laden PCV gases 22' are combusted in the cylinder 24 with the aerosolized fuel 32". As a result, the amount of visible carbon buildup, such as is shown in FIG. 2, is significantly reduced as oil from the oil laden PCV gases 22' is "washed" off and combusted, and is not permitted to accumulate on the valve 25 or valve stem 25'. Thus, excess oil does not become encrusted on the valve 25 or valve stem 25' from the heat generated during operation of the internal combustion engine 20.

Conversely, and with reference to the internal combustion engine 20 comprising a direct fuel injector 26' of FIG. 4, aerosolized fuel 32" is injected directly into the cylinder 24, downstream of the valve 25 and valve stem 25'. As will be appreciated, during operation of an internal combustion engine 20 comprising a direct fuel injector 26', there is no supply of aerosolized fuel 32" to "wash" the oil from the oil laden PCV gases 22' from the valve 25 and valve stem 25' during operation. As such, oil from the oil laden PCV gases 22' accumulates on the valve 25 and the valve stem 25' during operation of an internal combustion engine 20 comprising a direct fuel injector 26', and this oil becomes encrusted thereon from the heat generated during operation of the internal combustion engine 20.

Thus, after even a modest operational life of 60,000 miles, the valves 25 and corresponding valve stems 25' of an internal combustion engine 20 employing direct fuel injectors 26' exhibit significant amounts of visible carbon buildup, as shown best in the photograph of FIG. 2. As will be appreciated by those of skill in the art, the visible carbon buildup shown in FIG. 2, at a minimum, will significantly reduce the operational efficiency of an internal combustion engine 20. More importantly, in many cases, the visible carbon buildup shown in FIG. 2 leads to premature and catastrophic failure of an internal combustion engine 20, requiring total overhaul or replacement, at significant and avoidable expense to the owner of the vehicle.

Figure 5:
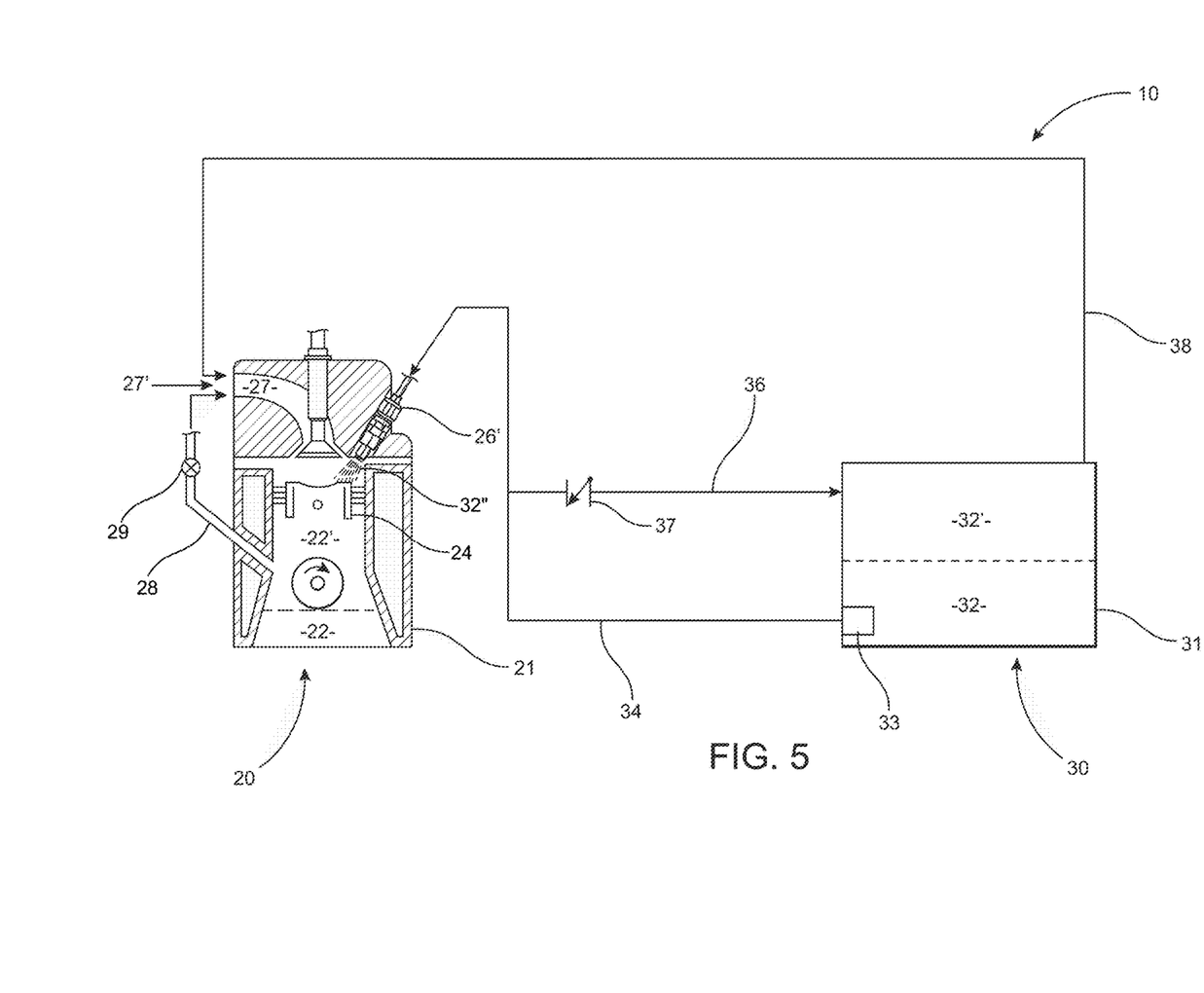
FIG. 5 is a diagrammatic representation of an internal combustion engine assembly employing a direct fuel injector.

FIG. 5 is a diagrammatic representation of an internal combustion engine assembly 10 employing direct fuel injection, i.e., having one or more direct fuel injectors 26'. As shown in FIG. 5, an internal combustion engine 20 includes a crankcase 21 containing an amount of engine oil 22 to lubricate the crankshaft 23, among other internal moving parts. One or more cylinders 24 are mounted in communication with the crankcase 21, and a corresponding valve 25 is operative with each cylinder 24. Each valve 25 has a corresponding valve stem 25' which is operative with the valve 25 into the cylinder 24 to compress an amount of fuel and air for combustion.

As previously stated, oil laden PCV gases 22' are present in the headspace above the oil 22 in the crankcase 21 while the internal combustion engine 20 is in operation, as shown, once again, in FIG. 5. The oil laden PCV gases 22' are periodically vented from the crankcase 21 during operation of the internal combustion engine 20 into the air intake manifold 27 of the internal combustion engine 20, along with an amount of fresh air intake 27'. One or more direct fuel injectors 26' are employed to inject an amount of aerosolized fuel 32" directly into a cylinder 24 for combustion.

As also shown in FIG. 5, a fuel supply 30 includes a fuel tank 31 having an amount of fuel 32 therein. An amount of fuel enriched vapor 32' is present in the headspace above the fuel 32 in the fuel tank 31. As will be appreciated, the concentration of fuel 32 in the fuel enriched vapor 32' is based in part on the temperature and pressure in the headspace of the fuel tank 31. A fuel tank vent line 38 allows an amount of fuel enriched vapor 32' to be vented directly into the air intake manifold 27 of the internal combustion engine 20.

A fuel pump 33 transfers fuel 32 from the fuel tank 31 to the direct fuel injectors 26'. Further, a fuel return line 36 is disposed in operative communication in the fuel supply line 34 between the fuel tank 31 and the direct fuel injectors 26' to allow excess fuel 32 to be routed back to the fuel tank 31. A fuel return check valve 37 controls the amount of fuel 32 routed back to the fuel tank 31. The fuel return check valve 37 employs a one way check valve configuration, in this instance, to assure that neither fuel 32 nor fuel enriched vapor 32' from the fuel tank 31 enter fuel supply line 34 by way of fuel return line 36.

Figure 6:
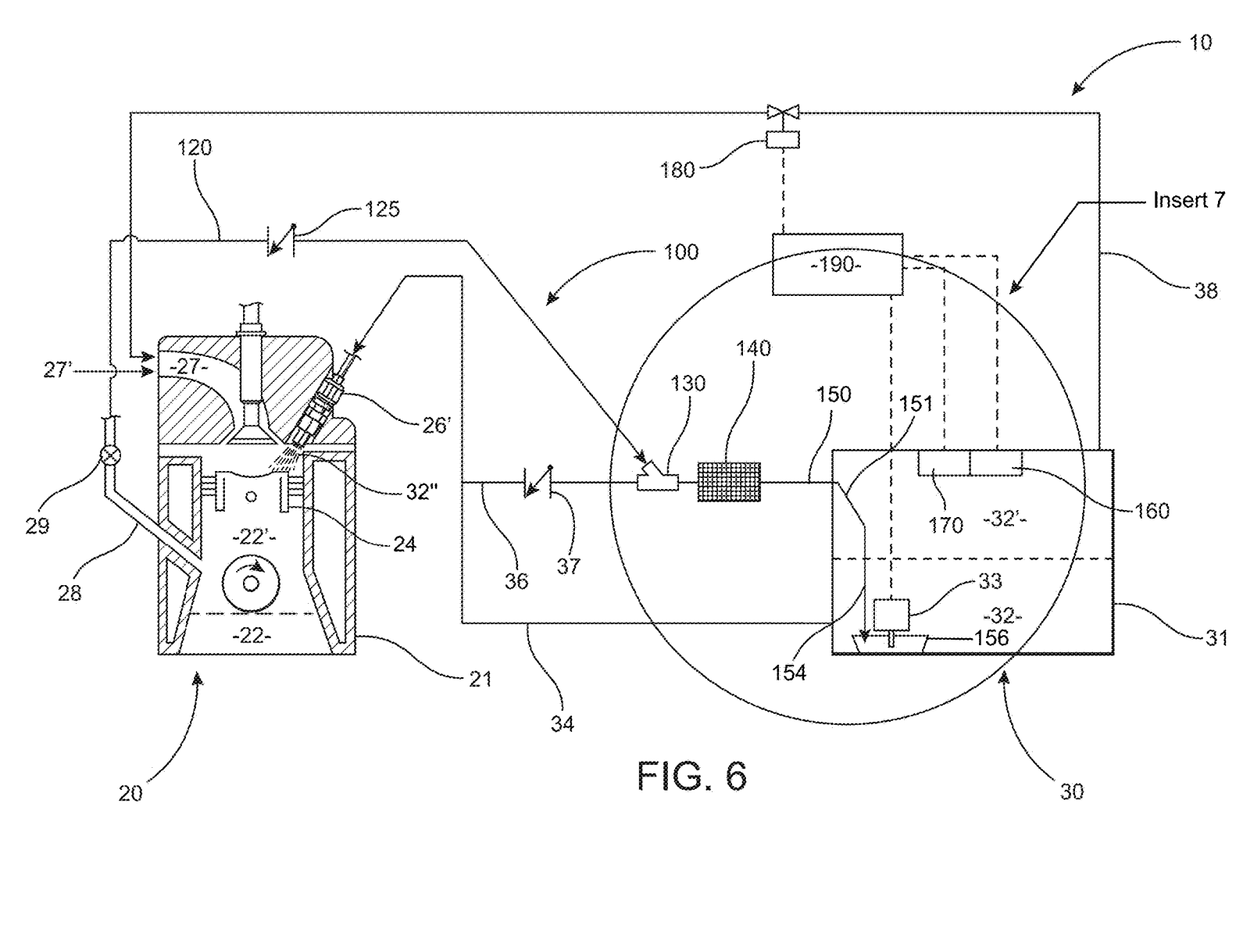
FIG. 6 is a diagrammatic representation of the internal combustion engine assembly of FIG. 5 incorporating one illustrative embodiment of a positive crankcase ventilation gas diversion system in accordance with the present invention.

FIG. 6 is illustrative of one embodiment of a positive crankcase ventilation gas diversion system 100 in accordance with the present invention. As shown in the illustrative embodiment of FIG. 6, an internal combustion engine assembly 10 includes an internal combustion engine 20 having an air intake manifold 27 and a positive crankcase ventilation line 28.

As further shown in FIG. 6, a fuel supply 30 includes a fuel tank 31 having an amount of liquid fuel 32 and an amount of fuel enriched vapor 32' in the headspace thereover. A fuel pump 33 is disposed in a fuel communicating relation with a fuel supply line 34, and a controller 190 operates in communication with the fuel pump 33 to regulate an amount of fuel 32 supplied to and discharged from the direct fuel injectors 26' of the internal combustion engine 20 during operation. A fuel return line 36 is disposed in communication with the fuel supply line 34, and is operative with a fuel return check valve 37 to return excess fuel 32 to the fuel tank 31. As also shown in FIG. 6, a fuel tank vent line 38 is provided to discharge fuel enriched vapor 32' from the headspace of the fuel tank 31 into the air intake manifold 27 of the internal combustion engine 20, for combustion therein.

As shown in FIG. 6, a PCV valve 29 controls the discharge of oil laden PCV gases 22' from the crankcase 21 of the engine 20. As previously described with reference to FIG. 5, in an internal combustion engine 20 employing direct fuel injectors 26', oil laden PCV gases 22' are vented into the air intake manifold 27 and onto the valve 25 and valve stem 25', which become visibly encrusted with hardened carbon buildup after only moderate use.

As shown in FIG. 6, in at least one embodiment of the present positive crankcase ventilation gas diversion system 100, a PCV gas diversion line 120 is connected to the positive crankcase ventilation line 28, downstream of the PCV valve 29. A diversion check valve 125 is disposed in the PCV gas diversion line 120 to prevent backflow through the present system 100 into the crankcase 21 of the internal combustion engine 20.

More in particular, and as shown in the illustrative embodiment of FIG. 6, a PCV gas diversion line 120 diverts oil laden positive crankcase ventilation ("PCV") gases 22' from being vented into the air intake manifold 27 of the internal combustion engine 20. In at least one embodiment, a PCV gas diversion interconnect 130 directs oil laden PCV gases 22' vented from the crankcase 21 into the fuel return line 36 of the fuel supply 30. In yet one further embodiment, such as is also illustrated in FIG. 6, a PCV diversion interconnect 130 is installed in a fuel return line 36 downstream of a fuel return check valve 37 which, as noted above, in at least one embodiment comprises a one way check valve.

In accordance with the illustrative embodiment of a positive crankcase ventilation gas diversion system 100 as shown in FIG. 6, an oil-vapor diffuser 140 is operatively positioned in a fuel return line 36, downstream of a PCV diversion interconnect 130. As such, oil laden PCV gases 22' diverted from the crankcase 21 through the PCV diversion line 120 are mixed with an amount of excess fuel 32 being returned to the fuel tank 31. The excess fuel 32 present in fuel return line 36 at least partially dissolves some of the oil from the oil laden PCV gases 22', prior to entering oil-vapor diffuser 140.

In at least one embodiment, an oil-vapor diffuser 140 at least partially strips or separates crankcase oil 22 from oil laden PCV gases 22' such that the oil 22 is readily mixed with and dissolved into excess fuel 32 from fuel return line 36. In at least one further embodiment, an oil-vapor diffuser 140 also strips or separates residual water or moisture from oil laden PCV gases 22', and the residual water is mixed with excess fuel 32 from fuel return line 36. An oil vapor diffuser 140 in accordance with one embodiment of the present system 100 comprises a diffusion chamber (not shown) at least partially filled with an amount of screen, mesh, etc., to provide contact area for oil laden PCV gases 22' to contact and at least partially separate crankcase oils 22 from the oil laden PCV gases 22'. In one embodiment, the screen or mesh of an oil-vapor diffuser 140 is constructed of metal, plastic, ceramic, etc., and in at least one further embodiment, the screen, mesh, etc., is constructed of stainless steel.

In one further embodiment, the diffusion chamber (not shown) of an oil vapor diffuser 140 in accordance with the present invention contains an amount of a solvent, such as, gasoline, diesel fuel, alcohol, or other organic solvent(s) suitable for dissolution of crankcase oil 22 therein. The amount of solvent is regulated by controller 190 such that the amount of solvent required to dissolve the crankcase oil 22 present in the from the oil laden PCV gases 22'is minimized. More in particular, the amount of solvent is regulated to achieve a ratio of solvent to oil 22 wherein the solvent will dissolve the oil 22 as well as reduce the amount of carborated vapor discharged into the fuel tank 31, and subsequently, into the air intake manifold 27.

Figure 7:
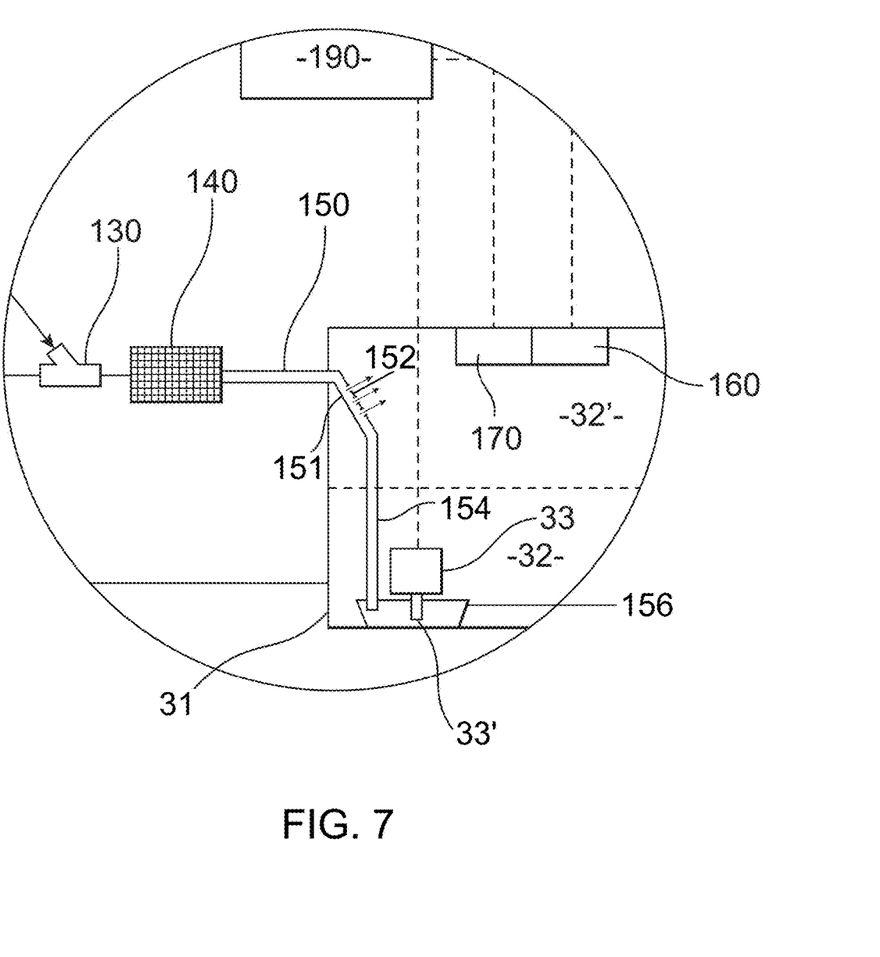
FIG. 7 is a diagrammatic representation of the portion of the positive crankcase ventilation gas diversion system of FIG. 6 identified as Inset 7.

With reference once again to the illustrative embodiment of a positive crankcase ventilation gas diversion system 100 as shown in FIG. 6, a diffuser return line 150 is mounted to the discharge of the oil-vapor diffuser 140, and is routed into fuel tank 31. In at least one embodiment, diffuser return line 150 includes a sloped portion 151 with is angled downwardly into the fuel tank 31, such as is shown in the illustrative embodiment of FIG. 6. The sloped portion 151 may be oriented at a downward angle of between about thirty degrees and sixty degrees relative to the diffuser return line 150. As shown in FIG. 7, which is an enlarged view of the portion of the illustrative embodiment of FIG. 6 identified as Inset 7, sloped portion 151 of the diffuser return line 150 extends downwardly into the fuel tank 31 at an angle of about sixty degrees. With further reference to the illustrative embodiment of FIG. 7, the sloped portion 151 of the diffuser return line 150 includes a plurality of vapor release apertures 152 disposed along an upper surface of sloped portion 151. The vapor release apertures 152 serve to allow oil laden PCV gases 22' at least partially stripped of crankcase oils 22 in the oil-vapor diffuser 140 to vent into the headspace above the fuel 32 in fuel tank 31.

Looking further to the illustrative embodiment of FIGS. 6 and 7, diffuser return line 150 further comprises an oil-fuel return line 154, which extends downwardly from the sloped portion 151 towards the bottom of fuel tank 31. In at least one embodiment, the present positive crankcase ventilation gas diversion system 100 comprises an oil-fuel collector 156. More in particular, an oil-fuel collector 156 is positioned proximate the discharge of oil-fuel return line 154, such as is shown by way of example in the illustrative embodiments of FIGS. 6 and 7. The oil-fuel return line routes oil laden fuel and/or other oil laden solvent(s) containing dissolved oil 22 therein from the oil-vapor diffuser 140. As further shown in FIG. 7, in at least one embodiment, a fuel pump 33 comprises a fuel pump feed line 33' which extends downwardly into oil-fuel collector 156. In operation, a fuel pump 33 of an internal combustion engine assembly 10 having a positive crankcase ventilation gas diversion system 100 in accordance with the present invention supplies fuel 32 combined with oil laden fuel and/or other oil laden solvent(s) containing dissolved oil 22 therein from oil-fuel collector 156 to the direct injectors 26 for combustion. As will be appreciated by those of skill in the art, residual amounts of water stripped from the oil laden PCV gases 32' are also mixed in with the excess fuel 32 discharged from the oil-vapor diffuser 140, and are also collected in the oil-fuel collector 156. As such, residual amounts of water are also pumped from oil-fuel collector 156 to direct injectors 26 for combustion.

A positive crankcase ventilation gas diversion system 100 in accordance with the present invention not only diverts oil laden PCV gases 22' from the air intake manifold 27 of an internal combustion engine 20, but the system 100 also separates crankcase oil 22 and residual moisture from oil laden PCV gases 22', via an oil-vapor diffuser 140, which are then supplied to direct fuel injectors 26 for combustion in an internal combustion engine 20. As such, the present system 100 substantially reduces the amount of crankcase oils 22 which enter an air intake manifold 27 of an internal combustion engine 20 entrained in oil laden PCV gases 22', thereby substantially reducing the amount of carbon buildup occurring on the valves, valve stems, and other internal engine components, and significantly increasing the operative life of the internal combustion engine 20.

In at least one further embodiment of a positive crankcase ventilation gas diversion system 100 in accordance with the present invention, a pressure sensor 160 is mounted in communication with a fuel tank 31 to measure a vapor pressure in the headspace thereof. The pressure sensor 160 is operatively communicative with a controller 190, which is further operative with a fuel tank vent valve 180 operatively disposed in a portion of a fuel tank vent line 38, such as is shown by way of example in the illustrative embodiment of FIG. 6. More in particular, when pressure sensor 160 detects a vapor pressure in the headspace of the fuel tank 31 that is outside of a predetermined pressure range, controller 190 actuates and opens fuel tank vent valve 180 and discharges fuel enriched vapor 32' from the headspace of the fuel tank 31 to the air intake manifold 27 of the internal combustion engine 20 via the fuel tank vent line 38. As such, the controller 190 serves to maintain the vapor pressure in the headspace within the predetermined pressure range. In accordance with at least one embodiment of the present invention, the predetermined pressure range is about 1 to about −1 pounds per square inch gauge. In at least one further embodiment, the predetermined pressure range is about 0 to about −1 pounds per square inch gauge.

In still one further embodiment of a positive crankcase ventilation gas diversion system 100 in accordance with the present invention, a controller 190 regulates an amount of fuel 32 supplied to the internal combustion engine 20 based at least partially on an amount of fuel enriched vapor 32' discharged to the air intake manifold 27 of the internal combustion engine 20 via actuation of fuel tank vent valve 180.

In yet another embodiment, the controller 190 is further operative with the fuel pump 33 of the internal combustion engine assembly 10. More in particular, the controller 190 regulates an amount of fuel 32 supplied to the internal combustion engine 20 based at least partially on an amount of fuel enriched vapor 32' discharged to the air intake manifold 27 of the internal combustion engine 20.

In at least one embodiment, a positive crankcase ventilation gas diversion system 100 further comprising a fuel concentration sensor 170 which measures a concentration of fuel in fuel enriched vapor 32' in the headspace of fuel tank 31. In still one further embodiment, a controller 190 regulates an amount of fuel 32 supplied to an internal combustion engine 20 based at least partially on an amount and a concentration of fuel enriched vapor 32' discharged to an air intake manifold 27 of the internal combustion engine 20.

As will be further appreciated by those of skill in the art, under certain operating conditions, the present system 100 can be employed to operate an internal combustion engine 20 solely by supplying fuel enriched vapors 32' from the headspace of the fuel tank 31 to the air intake manifold 27 of the engine 20 via operation of the fuel tank vent valve 180 by the controller 190.

Figure 8:
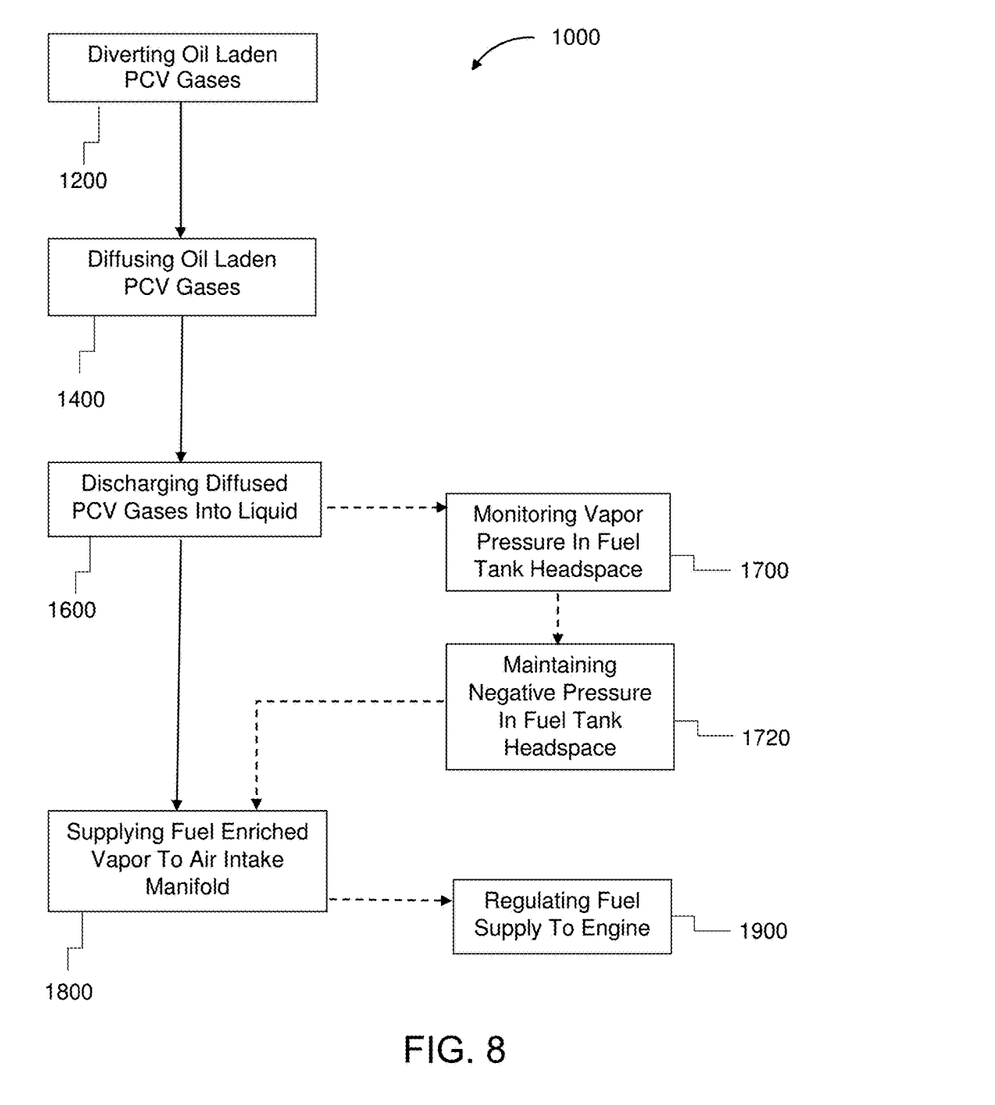
FIG. 8 is a schematic representation of one illustrative embodiment of a method for reducing positive ventilation gas emissions in accordance with the present invention.

The present invention further encompasses a method for reducing positive crankcase ventilation gas emissions, such as is shown at 1000 in the illustrative embodiment of FIG. 8. The present method 1000 may be employed on any type of internal combustion engine, regardless of the type of fuel injection system employed, e.g., direct fuel injection, indirect fuel injection, or a combination of the two as in a duel fuel injection system. The present method 1000 comprises diverting an amount of oil laden PCV gases 1200 from an air intake manifold of an internal combustion engine. In a further embodiment, the present method includes diffusing oil laden PCV gases through an air-vapor diffuser 1400.

In one embodiment, the present method for reducing positive crankcase ventilation gas emissions 1000 comprises discharging an amount of diffused PCV gases 1600, and in at least one embodiment, PCV gases are diluted 1600 into an amount of liquid fuel. The present method 1000 further comprises supplying an amount of fuel enriched vapor to an air intake manifold of an internal combustion engine 1800.

In at least one embodiment, the present method for reducing positive crankcase ventilation gas emissions 1000 comprises monitoring a vapor pressure of fuel enriched vapor in a headspace of a fuel tank 1700. In one further embodiment, the present method 1000 comprises maintaining a negative pressure in a headspace of a fuel tank 1720. In at least one embodiment, the present method 1000 further comprises monitoring a concentration of fuel present in fuel enriched vapor in a headspace of a fuel tank. The present method 1000, in one further embodiment, also comprises regulating a fuel supply to a fuel injector of an internal combustion engine based at least partially upon an amount of fuel enriched vapor discharged to an air intake manifold of the internal combustion engine.

In yet one further embodiment, the present method for reducing positive crankcase ventilation gas emissions 1000 comprises regulating a fuel supply to a fuel injector 1900 of an internal combustion engine based at least partially upon a concentration of fuel in an amount of fuel enriched vapor discharged to an air intake manifold of the internal combustion engine.

The present system 100 has been disclosed and described herein with primary reference to a gasoline powered internal combustion engine operative having direct fuel injectors. It will, however, be appreciated by those of skill in the art that the present system 100 can be beneficially employed in any type of engine which routes oil laden positive crankcase gases into an air intake manifold, or otherwise, for combustion, such as, by way of example only, indirect injection engines, and duel fuel injection, i.e., both direct and indirect fuel injection, engines, just to name a few.

It will further be appreciated by those of skill in the art that the present system 100 and method 1000 can be beneficially employed on engines operative with other fuel sources including, but not limited to, diesel fuel, alcohol, biofuel, gasohol, etc. In addition, and again, although primarily described and disclosed herein with reference to a gasoline powered internal combustion engine such as are typically found in automobiles, the present system 100 and method 1000 are applicable to diesel powered engines, such as are found in tractors, buses, locomotives, etc., among others.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A positive crankcase ventilation gas diversion system for an internal combustion engine assembly employing direct fuel injection, wherein the internal combustion engine assembly includes: an internal combustion engine with an air intake manifold and a positive crankcase ventilation line; a fuel supply with a fuel tank having an amount of fuel and a headspace thereover having an amount of fuel enriched vapor therein, a fuel pump, a fuel supply line to provide fuel to one or more direct fuel injectors; and, a fuel return line and a fuel tank vent line; said positive crankcase ventilation gas diversion system comprising:

a positive crankcase ventilation gas diversion line diverts oil laden positive crankcase ventilation gases from the air intake manifold of the internal combustion engine, a positive crankcase ventilation gas diversion interconnect directs oil laden positive crankcase ventilation gases into the fuel return line of the fuel supply, an oil-vapor diffuser at least partially separates crankcase oils from the oil laden positive crankcase ventilation gases, a pressure sensor measures a vapor pressure in the headspace of the fuel tank, a fuel tank vent valve operative with the fuel tank vent line, and a controller actuates said fuel tank vent valve into an open position to discharge fuel enriched vapor to the air intake manifold of the internal combustion engine, upon detection of a vapor pressure in the headspace outside of a predetermined pressure range, thereby maintaining the vapor pressure in the headspace of the fuel tank within said predetermined pressure range.

2. The positive crankcase ventilation gas diversion system as recited in claim 1 wherein said predetermined pressure range is between about 0.0 and about −1.0 pounds per square inch gauge.

3. The positive crankcase ventilation gas diversion system as recited in claim 1 wherein said controller is further operative with the fuel pump.

4. The positive crankcase ventilation gas diversion system as recited in claim 3 wherein said controller regulates an amount of fuel supplied to the internal combustion engine by the fuel pump based at least partially on an amount of fuel enriched vapor discharged to the air intake manifold of the internal combustion engine.

5. The positive crankcase ventilation gas diversion system as recited in claim 1 wherein said controller regulates an amount of fuel supplied to the internal combustion engine based at least partially on an amount of fuel enriched vapor discharged to the air intake manifold of the internal combustion engine.

6. The positive crankcase ventilation gas diversion system as recited in claim 1 further comprising a fuel concentration sensor measuring a concentration of fuel in the fuel enriched vapor in the headspace of the fuel tank.

7. The positive crankcase ventilation gas diversion system as recited in claim 6 wherein said controller regulates an amount of fuel supplied to the internal combustion engine based at least partially on the concentration of fuel in the fuel enriched vapor discharged to the air intake manifold of the internal combustion engine.

8. The positive crankcase ventilation gas diversion system as recited in claim 7 wherein said controller is further operative with the fuel pump.

9. A positive crankcase ventilation gas diversion system for an internal combustion engine assembly employing direct fuel injection, wherein the internal combustion engine assembly includes: an internal combustion engine with an air intake manifold and a positive crankcase ventilation line; a fuel supply with a fuel tank having an amount of fuel and a headspace thereover having an amount of fuel enriched vapor therein, a fuel pump, a fuel supply line to provide fuel to one or more direct fuel injectors; and, a fuel return line and a fuel tank vent line; said positive crankcase ventilation gas diversion system comprising:
 a positive crankcase ventilation gas diversion line diverts oil laden positive crankcase ventilation gases from the air intake manifold of the internal combustion engine,
 a positive crankcase ventilation gas diversion interconnect directs oil laden positive crankcase ventilation gases into an oil-vapor diffuser, wherein said oil-vapor diffuser at least partially separates crankcase oils from the oil laden positive crankcase ventilation gases,
 a pressure sensor measures a vapor pressure in the headspace of the fuel tank,
 a fuel tank vent valve, and
 a controller actuates said fuel tank vent valve into an open position to discharge fuel enriched vapor to the air intake manifold of the internal combustion engine, upon detection of a vapor pressure in the headspace outside of a predetermined pressure range, thereby maintaining the vapor pressure in the headspace of the fuel tank within said predetermined pressure range.

10. The positive crankcase ventilation gas diversion system as recited in claim 9 wherein said predetermined pressure limit is between about 0.0 and about −1.0 pounds per square inch gauge.

11. The positive crankcase ventilation gas diversion system as recited in claim 10 wherein said controller is operative with said fuel pump.

12. The positive crankcase ventilation gas diversion system as recited in claim 11 wherein said controller regulates an amount of fuel supplied to the internal combustion engine by the fuel pump based at least partially on an amount of fuel enriched vapor discharged to the air intake manifold of the internal combustion engine.

13. A method for reducing positive crankcase ventilation gas emissions, the method comprising:
 diverting an amount of oil laden positive crankcase ventilation gases from the air intake manifold of an engine,
 diffusing the oil laden positive crankcase ventilation gases through an air-vapor diffuser,
 diluting at least some of the oil in the diffused positive crankcase ventilation gases into an amount of liquid fuel,
 supplying an amount of fuel enriched vapor from a headspace of a fuel tank to the air intake manifold of the engine, and
 monitoring a vapor pressure of fuel enriched vapor in the headspace of the fuel tank.

14. The method as recited in claim 13 further comprising maintaining a negative pressure in the headspace of the fuel tank.

15. The method as recited in claim 14 further comprising regulating an amount of fuel supplied to a fuel injector of the engine based at least partially upon the amount of fuel enriched vapor supplied to the air intake manifold of the engine.

16. The method as recited in claim 13 further comprising monitoring a concentration of fuel in the fuel enriched vapor in the headspace of the fuel tank.

17. The method as recited in claim 16 further comprising regulating an amount of fuel supplied to a fuel injector of the engine based at least partially upon the concentration of fuel in the fuel enriched vapor supplied to the air intake manifold of the engine.

\* \* \* \* \*